(12) United States Patent
Yang et al.

(10) Patent No.: US 8,891,908 B2
(45) Date of Patent: Nov. 18, 2014

(54) SEMANTIC-AWARE CO-INDEXING FOR NEAR-DUPLICATE IMAGE RETRIEVAL

(71) Applicant: NEC Laboratories America, Inc., Princeton, NJ (US)

(72) Inventors: Ming Yang, Sunnyvale, CA (US); Xiaoyu Wang, Sunnyvale, CA (US); Yuanqing Lin, Sunnyvale, CA (US); Qi Tian, Halotex, TX (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/077,424

(22) Filed: Nov. 12, 2013

(65) Prior Publication Data

US 2014/0133759 A1    May 15, 2014

Related U.S. Application Data

(60) Provisional application No. 61/726,150, filed on Nov. 14, 2012.

(51) Int. Cl.
*G06K 9/60* (2006.01)
*G06K 9/54* (2006.01)
*G06F 17/30* (2006.01)

(52) U.S. Cl.
CPC ............................ *G06F 17/30247* (2013.01)
USPC .......................................... 382/305; 382/306

(58) Field of Classification Search
CPC ............. G06F 21/32; G06F 17/30247; G06F 17/3028; G06K 9/6857; G06K 9/6807; G06K 9/00892
USPC ................ 382/115–125, 128–134, 159, 209, 382/217–222, 224–228, 305–306; 707/661–673, 736–750, 763, 765, 707/828–830
See application file for complete search history.

(56) References Cited

U.S. PATENT DOCUMENTS 7,725,484 B2 * 5/2010 Nister et al. .................. 707/763
2009/0067689 A1 * 3/2009 Porter et al. .................. 382/124

* cited by examiner

*Primary Examiner* — Brian Le
(74) *Attorney, Agent, or Firm* — Joseph Kolodka

(57) ABSTRACT

An image retrieval method includes learning multiple object category classifiers with a processor offline and generating classifications scores of images as the semantic attributes; performing vocabulary tree based image retrieval using local features with semantic-aware co-indexing to jointly embed two distinct cues offline for near-duplicate image retrieval; and identifying top similar or dissimilar images using multiple semantic attributes.

18 Claims, 5 Drawing Sheets

SEMANTIC-AWARE CO-INDEXING FOR NEAR-DUPLICATE IMAGE RETRIEVAL

This application is a utility conversion and claims priority to Provisional Application Ser. 61/726,150 filed Nov. 14, 2012, the content of which is incorporated by reference.

BACKGROUND

The present invention relates to image retrieval.

As the well-known saying goes, "A picture is worth a thousand words", images generally convey large amount of information. This leads to one fundamental challenge to content-based image retrieval: the retrieval algorithms have no clue which subset of the "thousand words" in a query that a user is searching for. For instance, the query in FIG. 4 shows a rocky coast, then is the user searching for the exact location, rocks of similar shapes, or any coast scene?

Both large-scale object recognition and near-duplicate image retrieval achieve significant advance in recent years, yet remain independent efforts due to different focuses on recognition accuracy and retrieval scalability. Conventional recognition approaches generally require substantial computation, which are hardly affordable in online image retrieval.

Large-scale object recognition and near-duplicate image retrieval largely remain independent efforts due to different focuses on recognition accuracy and retrieval scalability. Previous work on image retrieval either uses the local invariant features only or the semantic attribute only.

Local invariant image features are robust to delineate low-level image contents and capable of finding near-duplicate images in the database, i.e., images including the same object or scene but undergoing some lighting, scaling, and view angle changes. In contrast, classification scores by large-scale object recognition may reveal their semantic meanings, but the requirement of heavy computations makes it hard to be applied to online image retrieval.

SUMMARY

Systems and methods are disclosed for image retrieval. An image retrieval method includes learning multiple object category classifiers with a processor offline and generating classifications scores of images as the semantic attributes; performing vocabulary tree based image retrieval using local features with semantic-aware co-indexing to jointly embed two distinct cues offline for near-duplicate image retrieval; and identifying top similar or dissimilar images using multiple semantic attributes.

In various embodiments, the system works by extracting one or more local features and one or more semantic attributes only for the database images offline, applying similarity induced from the semantic attributes to alter the inverted indexes of local features organized by the vocabulary tree. At the online query stage, we only extract the local features of the query to keep the computation complexity the same as in the conventional vocabulary tree based image retrieval.

Advantages of the preferred embodiments may include one or more of the following. The semantic-aware co-indexing technique improves the retrieval precision of near-duplicate image retrieval, resulting in better user experience of image search. The optimized inverted indexes require less memory consumption given a desired image retrieval quality. Extracting the semantic attributes only at the offline stage assures the online retrieval efficiency. The co-indexing enhances the discriminative capability of the inverted indexes. Local invariant features are robust to delineate low-level image contents, in contrast, classification scores by large-scale object recognition may reveal their semantic meanings. The semantic-aware co-indexing process jointly embeds two strong cues offline for vocabulary tree based near-duplicate image retrieval.

DESCRIPTION

Figure 1:
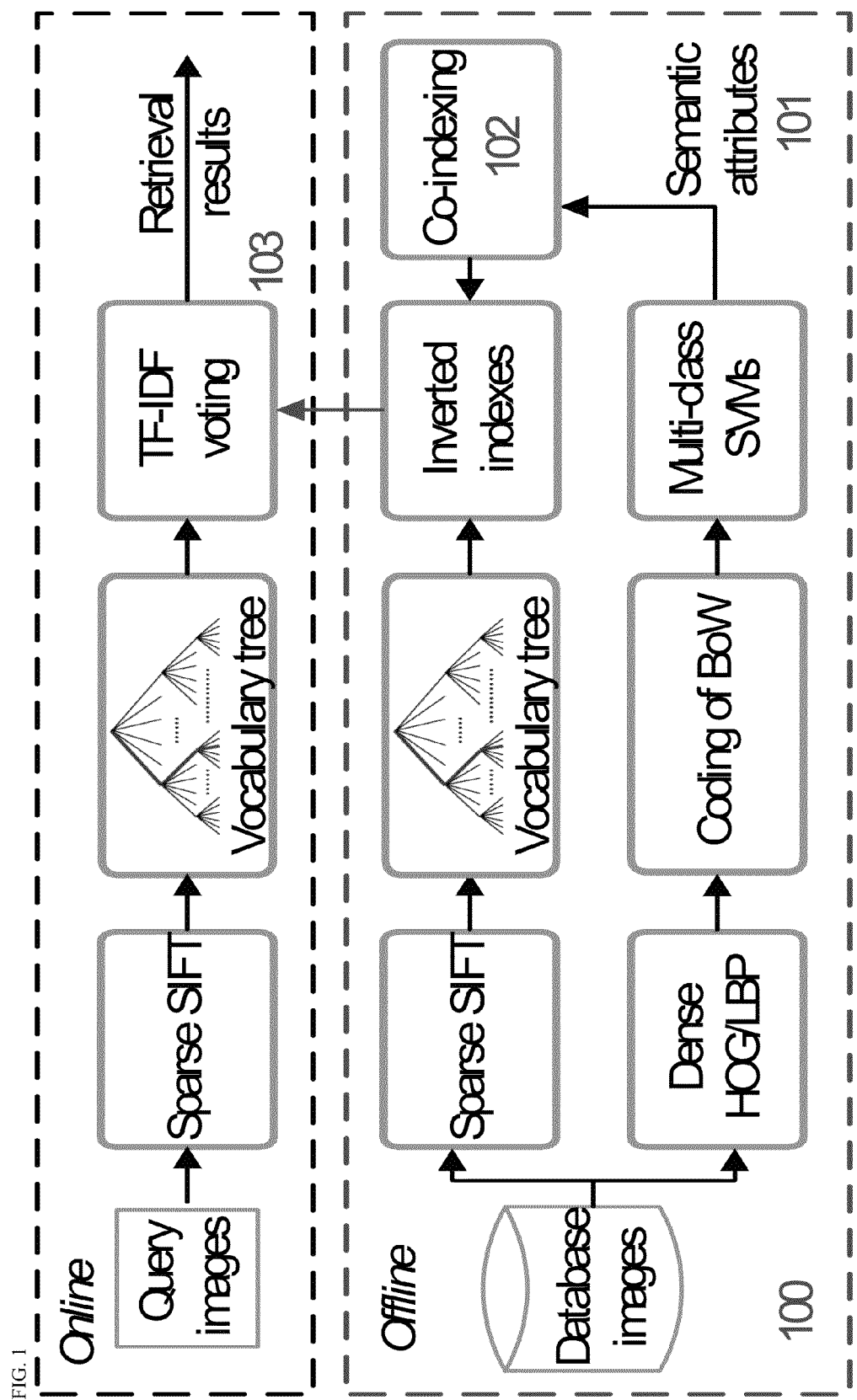
FIG. 1 shows an exemplary system for Semantic-Aware Co-Indexing for Near-Duplicate Image Retrieval.
Figure 2:
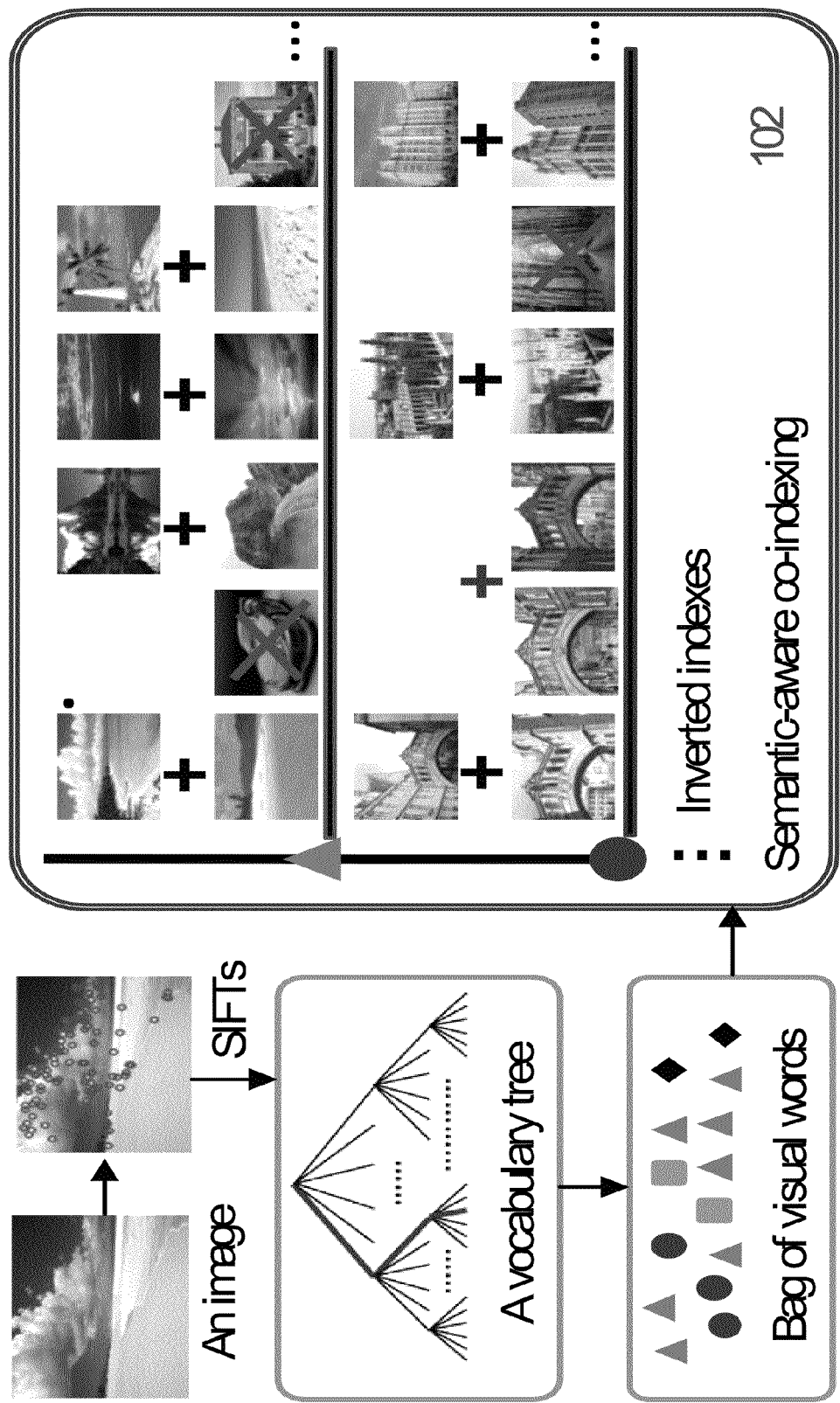
FIG. 2 shows a co-indexing procedure.
Figure 3:
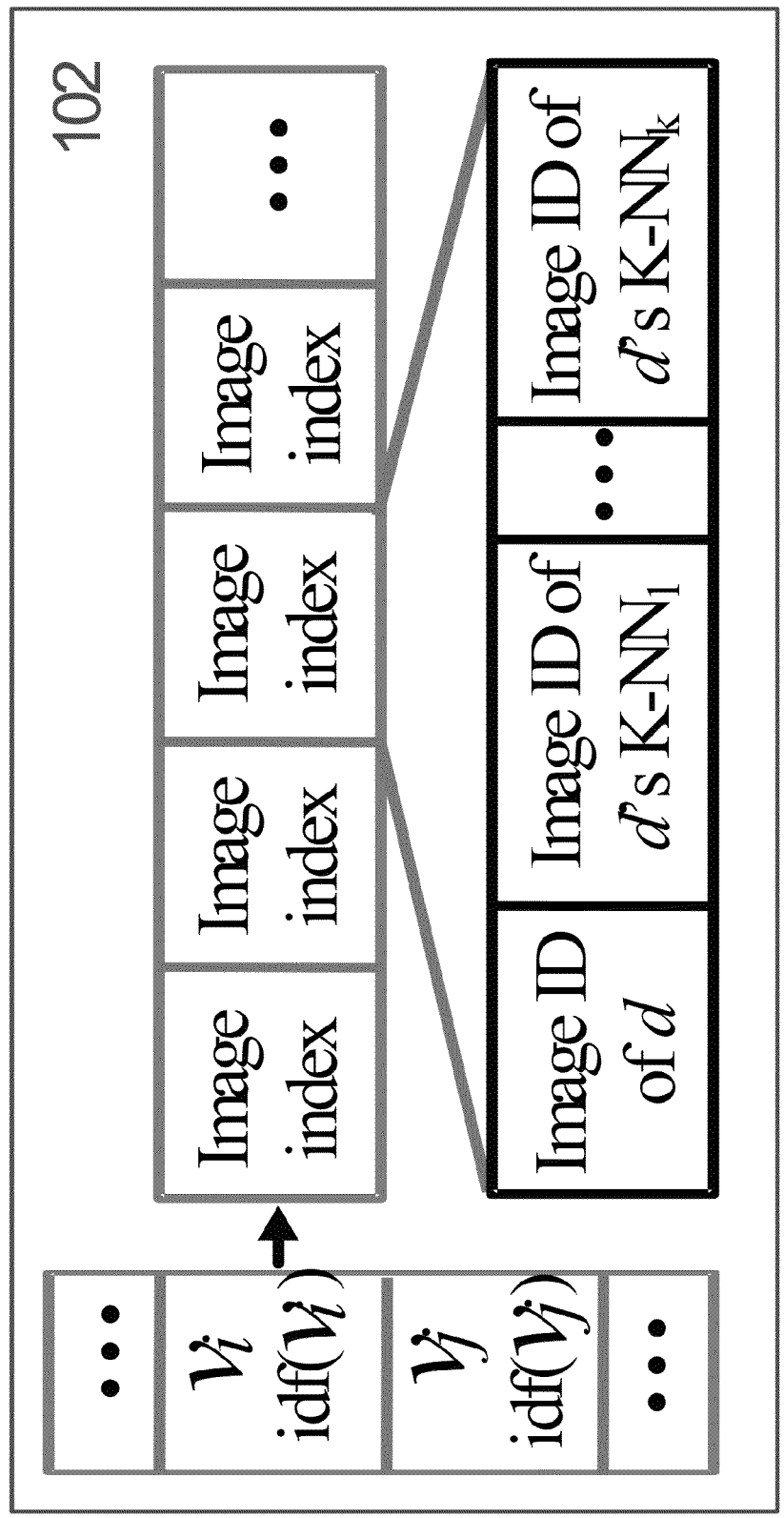
FIG. 3 shows an exemplary index data structure.

FIG. 1 shows an exemplary system for Semantic-Aware Co-Indexing for Near-Duplicate Image Retrieval while FIG. 2 shows a co-indexing procedure and FIG. 3 shows an exemplary index data structure. This invention proposes to integrate multi-class object recognition outputs, a.k.a., the semantic attribute features, into the inverted indexes of local features organized by a vocabulary tree during the offline indexing, so as to improve the precision of near-duplication retrieval.

In contrast to conventional image retrieval approaches, we extract local features and the semantic attributes only for the database images offline. Then we employ the similarity induced from the semantic attributes to alter the inverted indexes of local features organized by the vocabulary tree. At the online query stage, we only extract the local features of the query to keep the computation complexity the same as in the conventional vocabulary tree based image retrieval.

Turning now to FIG. 1, the system includes an off-line portion 100 that accesses database images and generates sparse SIFT data. The sparse SIFT is provided to a vocabulary tree and fed to a inverted indices module. The database images are also provided to a dense HOG/LBP module that provides output to a coding of BoW (Bag of Word) module, which feeds into a multi-class SVMs to generates semantic attributes 101 that are provided to a co-indexing module 102. The output of the co-indexing module 102 is provided to the inverted indices.

The inverted indices are used by the online system that receives query images. The query images are provided to the Sparse SHIFT whose output is processed by the vocabulary tree. A TF-IDF (term frequency inverse document frequency) of voting module 103 receives the outputs from the vocabulary tree and the inverted indices and generates retrieval results.

We learn multiple object category classifiers offline and employ their classifications scores of images as the semantic attributes. Then in the vocabulary tree based image retrieval using local features, we propose a semantic-aware co-indexing algorithm to jointly embed these two strong cues offline for near-duplicate image retrieval. We identify top similar or dissimilar images in the database using multiple semantic attributes, then insert to or remove the images from the corresponding inverted indexes, which effectively enhances the discriminative capability of the indexes by encoding two distinct cues. The online query employs only local features, leading to very small computation and memory overhead. FIG. 2 shows a co-indexing procedure and FIG. 3 shows an exemplary index data structure.

The system of FIG. 1 removes those images with dissimilar attributes that are isolated on an inverted index and insert images with similar semantic attributes to the inverted indexes of their local features, which results in jointly embedding the similarities in terms of both local features and semantic attributes in the inverted indexes. At the online retrieval stage, we conduct conventional vocabulary tree based retrieval only using the local features in a query and do NOT compute the semantic features, nevertheless, the retrieval implicitly promotes candidates that are potentially with similar attributes to the query since the indexes are semantic-aware. In this paper, we integrate two search criteria by incorporating semantic attributes into vocabulary tree based near-duplicate image retrieval, such that the retrieval not only searches for candidate images sharing similar local features but also encourages consensus in their semantic similarities without sacrificing online query efficiency. Towards these ends, we propose a semantic-aware co-indexing method which leverages semantic attribute features obtained by advanced object recognition to alter the inverted indexes of local features attached to vocabulary tree's leaves. Specifically, at the offline indexing stage, we adopt the classification scores of 1000 object categories in the ImageNet Challenge as the semantic attributes. Then we remove those images with dissimilar attributes that are isolated on an inverted index and insert images with similar semantic attributes to the inverted indexes of their local features, which results in jointly embedding the similarities in terms of both local features and semantic attributes in the inverted indexes. At the online retrieval stage, we conduct conventional vocabulary tree based retrieval only using the local features in a query and do NOT compute the semantic features, nevertheless, the retrieval implicitly promotes candidates that are potentially with similar attributes to the query since the indexes are semantic-aware.

In the offline indexing we consider the local invariant features and multi-class classification scores jointly, which are strong cues to literal image contents and their semantic meanings respectively. The online query reminds as efficient as before since merely local features are extracted. Meanwhile, by removing certain images from the inverted indexes, we manage to consume a small memory overhead. To our best knowledge, this semantic-aware co-indexing is an original effort on improving near-duplicate image retrieval by efficiently utilizing object recognition outcomes. Moreover, we do not assume query or dataset images are related to any of the 1000 object categories, which assures its generalization capability. Extensive experiments on 4 public datasets, i.e., UKbench, Oxford5K, Holidays, and ImageNet, have validated the merits of the proposed method in comparison with recent image retrieval algorithms.

Image retrieval with vocabulary trees is discussed next. We employ the vocabulary tree based image retrieval as our baseline. Denote q the query image and d an image in the database D, and q is represented by a bag $S_q$ of local descriptors $\{x_i\}_{i \in S_q}$, where $x_i \in R^D$ indicates SIFT descriptors of dimension D=128, so does $\{x_i\}_{j \in S_d}$ for a database image d.

Meanwhile, a vocabulary tree T is obtained by hierarchical K-means clustering of such local descriptors (extracted from a separate dataset), with a branch factor B and depth L. This tree T typically is very deep and contains millions of leaf nodes, e.g., B=10 and L=7, in order to balance the need for fast quantization and high distinctiveness. We quantize $\{x_i\}$ along T to the corresponding tree nodes or visual words $T(\{x_i\})B\{v_i\}$. Then the similarity sim(q,d) between q and d is defined as the average TF-IDF (term frequency-inverse document frequency) of these visual words:

$$sim(q, d) \doteq \frac{1}{|S_q||S_d|} \sum_{v_i \in T(x_i), v_j \in T(x_j)} w_v(v_i, v_j), \quad (1)$$

$$w_v(v_i, v_j) \doteq idf^2(v)1(v_i = v_j) = \log^2\left(\frac{M}{M_v}\right), \quad (2)$$

where 1(•) is the indicator function, M is the total number of database images and $M_v$ is the number of images containing at least one descriptor that quantizes to the node v. The list of $M_v$ database images and their TFs are stored in the inverted index to v for fast access during online retrieval and denoted by $I(v) = \{d_m\}_{m=1}^{M_v}$ and $\{tf_{d_m}(v)\}_{m=1}^{M_v}$.

Next, semantic attributes from object recognition is discussed. We follow the Bag-of-Words (BoW) paradigm to learn C=1000 object category classifiers from the training images in the LSVRC using the ImageNet dataset. For each database image, we obtain the BoW features from dense HOG and LBP which are further encoded by local coordinate coding to train multiple one-against-all linear SVM classifiers. The recognition accuracy for the top-5 candidate categories is about 65% according to the LSVRC's flat evaluation metric. The SVM margin scores of these 1000 categories are denoted by $\{f_c\}_{c=1}^{C}$ for a database image d, which is regarded as the semantic attributes of this image.

These 1000 categories in the LSVRC certainly cannot cover millions of all possible objects in the real-world. Therefore, different from conventional systems, we do not implicitly assume the query or the database images are related to one object category in the semantic attributes. In fact, our testing query and database images are independent from the ImageNet dataset, hence it is likely one image is relevant to none or multiple object categories in these 1000 attributes. Therefore, we do not assume "is a" or "has a" meaning for these attributes but a weaker "relevant to" relation.

Semantic-aware offline co-indexing is discussed next. Quantized local descriptors are not sensitive to image scaling and rotations, so the vocabulary tree based approach is capable of finding near-duplicates to a query, if they do present in the database. Otherwise, this method tends to return candidates with similar low-level textures to the query, yet which may appear irrelevant to users. In contrast, the attributes obtained by multi-class recognition may reveal rough high-level semantic contents. This motivates us to combine these two complimentary cues. We propose to employ the image similarities induced from the semantic attributes to offline update the image lists in the inverted indexes to enhance their discriminative capability. We refer this procedure as semantic-aware co-indexing.

FIG. 2 shows in more detail the co-indexing procedure. The co-indexing procedure is as follows: based on the semantic attributes, isolated images on the inverted indexes (red and blue lines) of two visual words (red ball and blue triangle) are removed, marked by the red check mark; most similar images are inserted to the inverted indexes indicated by the black plus symbol. The discriminative capacity of a single local descriptor is limited due to two reasons: 1) certain similar or generic local descriptors may appear in dramatically different images; 2) local descriptors even on near-duplicate images may fall to different visual words due to quantization errors. The semantic-aware co-indexing addresses these two issues by 1) spotting the isolated images on an inverted index according to their semantic attributes and removing it from the indexes; and 2) searching for the top nearest neighbors of database images and inserting them to the inverted indexes.

As illustrated in FIG. 3, after the co-indexing, the images on one inverted index appears more consensus with each other.

Distance of semantic attributes is discussed next. Let us first define the similarity of semantic attributes among images, then proceed to the specific means to alter the inverted indexes. We convert the SVM scores $\{f_c\}_{c=1}^C$ to a probabilistic representation $\{p_c\}_{c=1}^C$ by fitting sigmoid functions to each dimension. For an image d, each entry $p_c(d)$ is proportional to $P(c|d)$, the likelihood of being relevant to the category c. As discussed in Sec. 3.2, $\{p_c(d)\}_{c=1}^C$ is not naturally normalized since one image may be related to multiple categories, and we regard it as a partial probability distribution. For two images $d_m$ and $d_n$, we employ the Total Variance Distance (TVD) to measure the semantic distance between their partial probability vectors:

$$TVD(d_m, d_n) = \sum_{c=1}^{C} |p_c(d_m) - p_c(d_n)|. \quad (3)$$

In our settings, the TVD indicates the summed divergence of probability that two images could be recognized to relate to the same object category. Thus, it reasonably reflects the semantic similarity between two images. In this paper we use the TVD due to its intuition and efficiency.

In semantic isolated image deletion, for the images indexed to a visual word v, i.e., $I(v) = \{d_m\}_{m=1}^{M_v}$, we calculate the semantic distances of attributes as in Eq. (3) among them and delete the isolated images, which are specified as semantically distinct from all the other images in the same inverted index ($M_v >= 3$), i.e., image $d_n$ that satisfies:

$$\min_{m=1, m \neq n}^{M_v} TVD(d_n, d_m) > \alpha, \quad (4)$$

where $\alpha$ is a threshold to tune the portion of images to be deleted. Such isolated images would contribute less in image retrieval since they are so different from any other images on the same index. Hence, we remove them to obtain more consistent inverted indexes from the perspective of semantic attributes, as well as to reduce the size of indexes.

For semantic nearest image insertion, after the deletion of isolated images, we compare the attributes of d using Eq.(3) to identify their top K nearest images in the database, denoted by $N_K(d)$. If one nearest image $d_k$ to d does not appear on the same inverted index, we insert it to this entry of d's inverted index, as illustrated in the index data structure in FIG. 4. Namely, $d_k$ is inserted to I(v), iff, $$d_k \in N_k(d), d \in I(v), d_k \notin I(v). \quad (5)$$

Note that, it is very likely that $d_k \in N_K(d)$ already appears in the inverted index that includes d, since semantically similar images shall share some similar local features, for which case we do not introduce redundant image IDs in the index. Therefore, this semantic nearest image insertion (SNID) does not increase the size of inverted indexes by K times. We will discuss how to further reduce the memory cost of the indexes in Sec. 4.1. The set of $d_k$ that is inserted to the inverted indexes due to d is referred by $G_(KNN)(d)$. FIG. 3 shows the exemplary data structure for co-indexing.

Semantic-aware online query is discussed next. The online query process is almost identical to the conventional vocabulary tree based retrieval, except that we jointly consider the similarity based on the local features and the semantic attributes. Given q and d are the query and a database image, respectively, then the similarity between q and d is conceptually defined as:

$$\hat{sim}(q, d) \doteq sim(q, d) + \sum_{d_g \in G_{KNN}(d)} \omega \times sim(q, d_g), \quad (6)$$

where $\omega$ is a weighting parameter of the contribution from semantic attributes, and $G_{KNN}(d)$ is the set of database images whose K semantic nearest images include d. We incorporate the semantic clue by voting additional weighted TF-IDF of the semantic nearest images to the final similarity of d. Consequently, the candidate images, not only sharing a large portion of similar local feature but also consistent with the semantic attributes, will be ranked higher in the retrieved set. Ideally, the weighting parameter omega shall be determined by the TVD of $d_g$ or its rank in the $N_k(d)$, which requires the storage of different $\omega$ in the inverted indexes. According to our experiment, this memory overhead is not worthwhile, and empirically we use a fixed $\omega = 0.02$ in our implementation.

Note that in online retrieval stage, we do not need to explicitly identify the set $G_{KNN}(d)$ for each database image to compute Eq. 6. Instead, we only need to scan image lists attached to the visual words found in the query image, as well as the semantic nearest image recorded in the image lists. We summarize the online computation of Eq. (6) with the following pseudo-code for similarity calculation between a query and database images

---

Algorithm 1 Similarity calculation between a query q and all database images.

---

Figure 4:
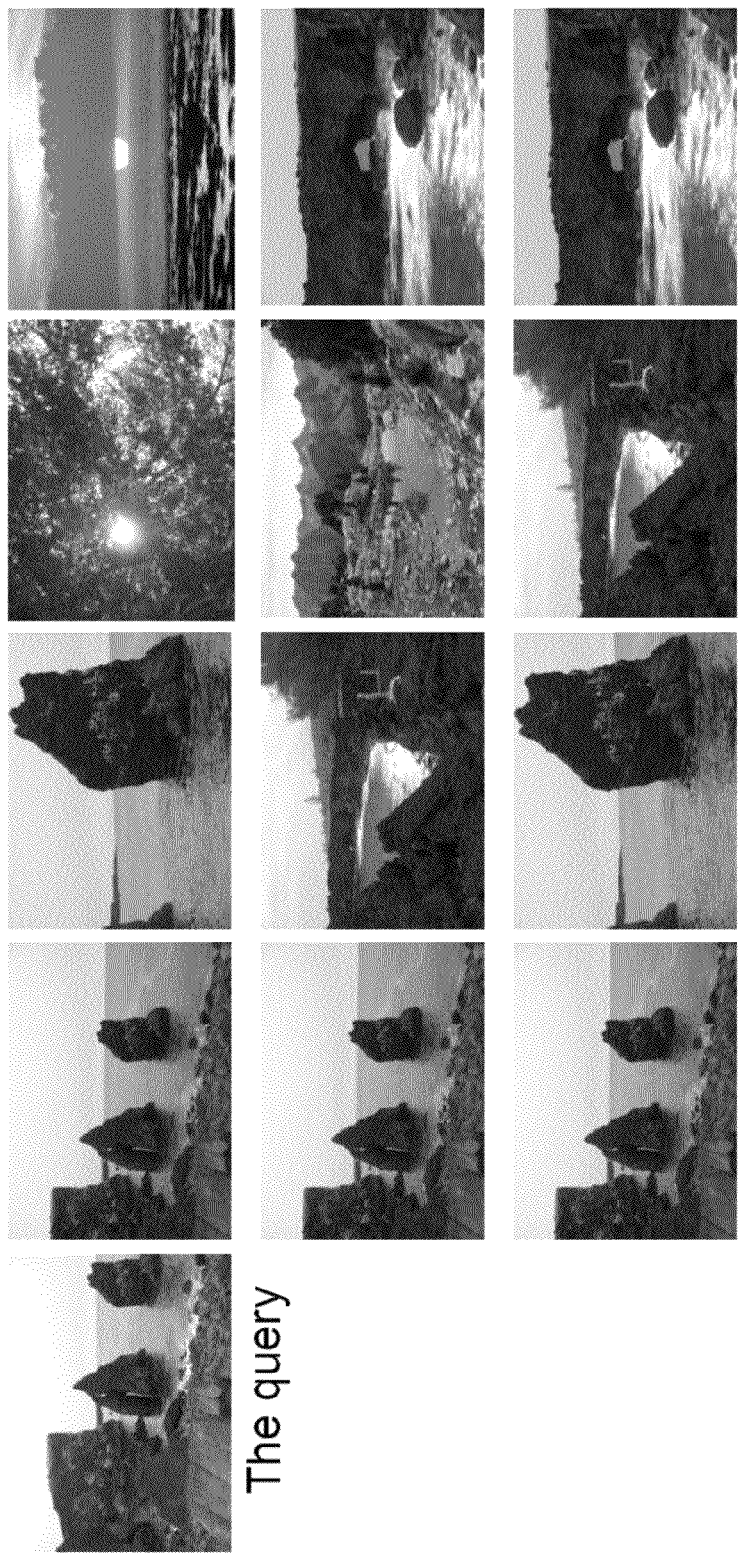
FIG. 4 shows an exemplary comparison of query retrieval of the instant system and conventional systems.
Figure 5:
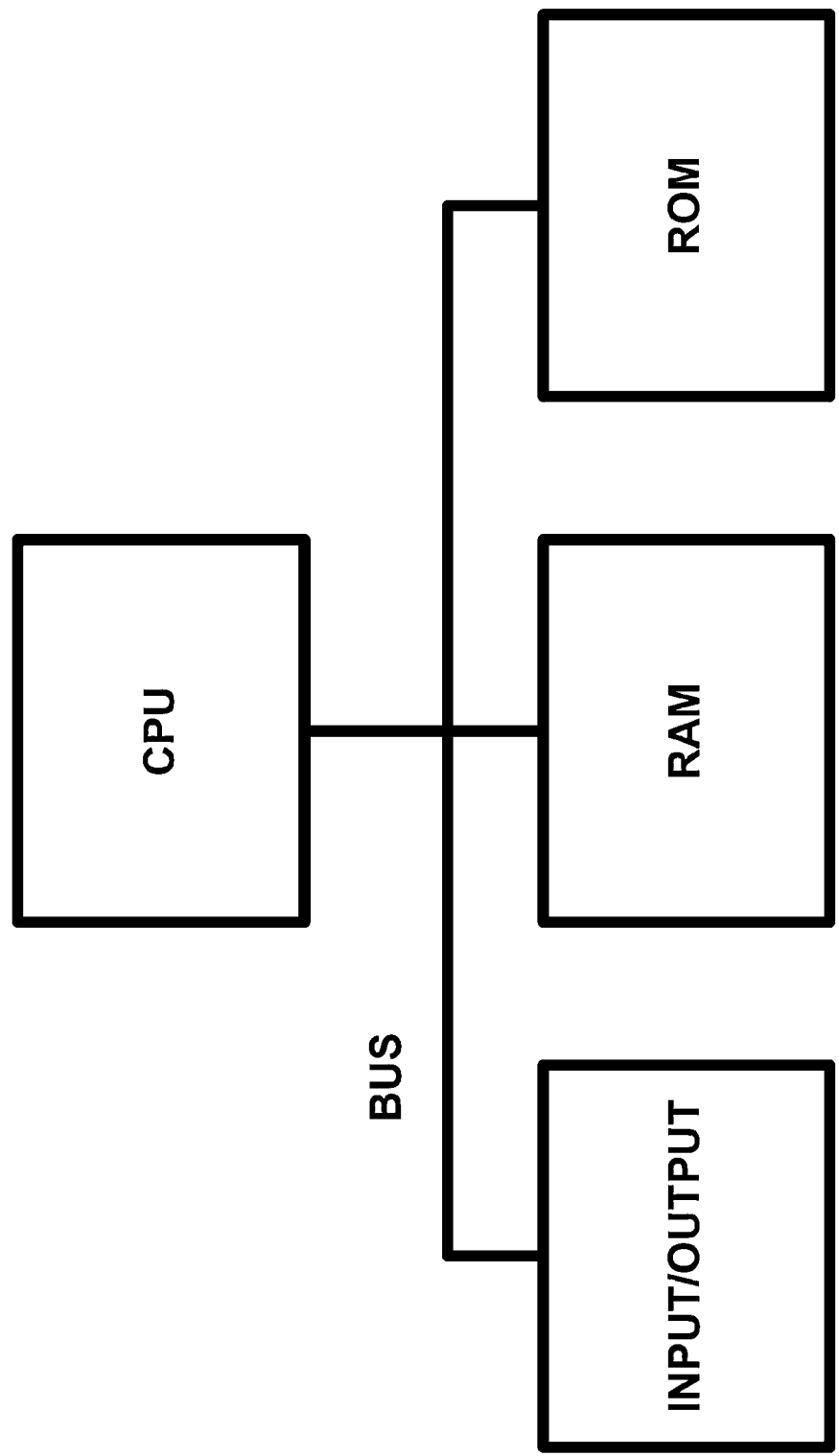
FIG. 5 shows an exemplary computer to handle the image retrieval tasks.

Input: the inverted indexes I(v) stored as in Fig. 4; the
   BoW representation of a query image: $\{v_t\}_{t \in S_q}$; the
   weighting parameter w.
Output: the similarity vector of $\hat{sim}$ (q, d).
   for each visual word v in $\{v_t\}_{t \in S_q}$ do
     for each database image d in the image list I(v) do
        $\hat{sim}$ (q, d) = $\hat{sim}$ (q, d) + $tf_d(v)tf_q(v)idf(v)$
        for each semantic nearest image $d_k$ of d do
           $\hat{sim}$ (q, $d_k$) = $\hat{sim}$ (q, $d_k$) + $w \times tf_d(v)tf_q(v)idf(v)$
        end for
     end for
   end for

---

We identify top similar or dissimilar images in the database using 1000 semantic attributes, then insert to or remove the images from the corresponding inverted indexes, which effectively enhances the discriminative capability of the indexes by encoding two distinct cues. The online query employs only local features, leading to very small computation and memory overhead. Experimental results and comparisons with recent retrieval methods on four datasets, i.e., UKbench, Oxford5K, Holidays, and 1.2 million images in the ImageNet all manifest the superior performance of our algorithm. FIG. 4 shows an exemplary comparison of query retrieval of the instant system and conventional systems. FIG. 4 shows exemplary results from a sample query from the Holidays dataset: retrieval using a vocabulary tree of local features (first row); retrieval using 1000 semantic attributes (second row); retrieval based on coindexing of both local features and semantic attributes (third row).

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An image retrieval method, comprising:
    learning multiple object category classifiers with a processor offline and generating classifications scores of images as the semantic attributes; and
    performing vocabulary tree based image retrieval using local features with semantic-aware co-indexing to jointly embed two distinct cues offline for near-duplicate image retrieval; and
    identifying top similar or dissimilar images using multiple semantic attributes;
    performing semantic-aware online querying;
    determining:

$$sim(q, d) \doteq \frac{1}{|S_q||S_d|} \sum_{v_i \in T(x_i), v_j \in T(x_j)} w_v(v_i, v_j),$$

$$w_v(v_i, v_j) \doteq idf^2(v)1(v_i = v_j) = \log^2\left(\frac{M}{M_v}\right),$$

where i and j are indices, x is tree node, S is a bag of local descriptions, q a query image, d a database image, T is a vocabulary tree, w is word, idf is an inverse document frequency of node v, M is a total number of database images and $M_v$ is a number of images containing at least one descriptor that quantizes to a node v.

2. The method of claim 1, comprising inserting and removing images to and from the inverted indexes based on semantic attributes.

3. The method of claim 1, wherein the online query employs only local features.

4. The method of claim 1, comprising co-indexing local features and semantic attributes offline in inverted indexes for near-duplicate image retrieval.

5. The method of claim 1, comprising extracting the semantic attributes based on multi-class object recognition offline for the database images.

6. The method of claim 1, comprising using similar or dissimilar relations among images to alter the inverted indexes.

7. The method of claim 1, comprising identifying local features and top similar images according to semantic attributes in the tf-idf (term frequency-inverse document frequency) voting in online retrieval.

8. The method of claim 1, wherein q and d are the query and a database image, respectively, comprising determining a similarity between q and d as:

$$\hat{sim}(q, d) \doteq sim(q, d) + \sum_{d_g \in G_{KNN}(d)} \omega \times sim(q, d_g),$$

where ω is a weighting parameter of the contribution from semantic attributes, and $G_{KNN}(d)$ is the set of database images whose K semantic nearest images include d.

9. The method of claim 1, comprising determining similarity sim(q, d) between q and d as an average TF-IDF (term frequency-inverse document frequency).

10. The method of claim 1, comprising applying a Total Variance Distance (TVD) for two images $d_m$ and $d_n$, to measure the semantic distance between their partial probability vectors p:

$$TVD(d_m, d_n) = \sum_{c=1}^{C} |p_c(d_m) - p_c(d_n)|.$$

11. The method of claim 1, comprising performing sematic isolated image deletion.

12. The method of claim 1, comprising performing semantic aware co-indexing off line.

13. An image retrieval system, comprising:
    a processor;
    a database of images coupled to the processor;
    code for learning multiple object category classifiers with a processor offline and generating classifications scores of images as the semantic attributes; and
    code for performing vocabulary tree based image retrieval using local features with semantic-aware co-indexing to jointly embed two distinct cues offline for near-duplicate image retrieval; and
    code for identifying top similar or dissimilar images using multiple semantic attributes;
    code for performing semantic-aware online querying;
    code for determining:

$$sim(q, d) \doteq \frac{1}{|S_q||S_d|} \sum_{v_i \in T(x_i), v_j \in T(x_j)} w_v(v_i, v_j),$$

$$w_v(v_i, v_j) \doteq idf^2(v)1(v_i = v_j) = \log^2\left(\frac{M}{M_v}\right),$$

where i and j are indices, x is tree node, S is a bag of local descriptions, q a query image, d a database image, T is a vocabulary tree, w is word, idf is an inverse document frequency of node v, M is a total number of database images and $M_v$ is a number of images containing at least one descriptor that quantizes to a node v.

14. The method of claim 1, comprising code for inserting and removing images to and from the inverted indexes based on semantic attributes.

15. The method of claim 1, wherein the online query employs only local features.

16. The method of claim 1, comprising code for co-indexing local features and semantic attributes offline in inverted indexes for near-duplicate image retrieval.

17. The method of claim 1, comprising code for extracting the semantic attributes based on multi-class object recognition offline for the database images.

18. The method of claim 1, comprising code for using similar or dissimilar relations among images to alter the inverted indexes.

* * * * *